United States Patent [19]

Ibsen et al.

[11] 4,292,236

[45] Sep. 29, 1981

[54] COMPOSITION FOR REPAIR OF PORCELAIN FIXTURES

[75] Inventors: Robert L. Ibsen; William R. Reed, Jr., both of Santa Maria, Calif.

[73] Assignee: Den-Mat, Inc., Santa Maria, Calif.

[21] Appl. No.: 94,956

[22] Filed: Nov. 16, 1979

[51] Int. Cl.³ .............................. C08K 3/36; C09K 5/15
[52] U.S. Cl. ................................ 260/42.52; 260/42.15; 264/36
[58] Field of Search ............... 260/42.11, 42.15, 42.52; 264/36

[56] References Cited

U.S. PATENT DOCUMENTS

| | | | |
|---|---|---|---|
| 2,558,139 | 6/1951 | Knock et al. | 526/211 |
| 3,066,112 | 11/1962 | Bowen | 260/42.15 |
| 3,400,097 | 9/1968 | Weinstein et al. | 260/37 R |
| 3,539,533 | 11/1970 | Lee et al. | 526/211 |
| 3,629,187 | 12/1971 | Waller | 260/42.52 |
| 3,635,889 | 1/1972 | Bowen | 526/217 |
| 3,815,239 | 6/1974 | Lee | 433/228 |
| 3,905,110 | 9/1975 | Lee | 433/216 |
| 3,986,261 | 10/1976 | Faunce | 433/217 |
| 3,991,008 | 11/1976 | Temin | 260/42.15 |
| 4,028,325 | 6/1977 | King et al. | 260/42.15 |
| 4,117,595 | 10/1978 | Ihsen et al. | 264/16 |
| 4,150,012 | 4/1979 | Joos | 260/42.15 |

*Primary Examiner*—Donald E. Czaja
*Assistant Examiner*—W. Thompson
*Attorney, Agent, or Firm*—Owen, Wickersham & Erickson

[57] ABSTRACT

A kit containing the components essential for repairing, in situ, damaged or fractured porcelain plumbing fixtures and the like. A method for carrying out such repair includes cleaning, shaping, and priming the damaged area, applying a bonding agent preferably containing two silanes and a water-displacing solvent, then applying a filling agent comprising a blend of vitreous powder, a powdered polymer, and a resin binder, allowing the agent to set and harden, and finishing. A filler composition or agent and an advantageous bonding composition are also provided.

10 Claims, No Drawings

COMPOSITION FOR REPAIR OF PORCELAIN FIXTURES

BACKGROUND OF THE INVENTION

This invention concerns a kit for repairing damage to, and for restoring, damaged procelain plumbing fixtures, such as porcelain sinks, bathtubs, and toilet bowls. The invention concerns a method and a composition for making such repairs.

Porcelain plumbing fixtures are rather brittle, and they are sometimes fractured or partially broken off by accident, as by dropping something hard and heavy on them.

The present invention provides a kit, a method, and a composition for repair of such damaged porcelain. The kit contains all of the components necessary to make such repair, using as tools only customary or usually available, tools. The kit is advantageous because the damaged area can be quickly prepared for repair by, first, cleaning damaged surfaces, while providing suitable walls at the site and then treating with primer and bonding agent. Next, the filling component of the kit is prepared and placed in the cavity in the damaged porcelain, allowed to set, and then finished. The whole operation normally is carried out in minutes.

Another advantage of the present invention is that no glazing of the finished repair is necessary; although glazing can be effected if desired. The kit of this invention is easy to use, is compact, and can provide excellent shading of the repaired area to match the surrounding porcelain. The method and mixing techniques of this invention are simple and are easily carried out. The filler component obtainable with the kit of this invention can provide excellent shading, as noted. It also adapts well into the walls of the prepared surface and adapts well to prepared margins of such surface, so that the restoration is easy to finish.

The invention incorporates a system and materials for opaquing out the metal base in instances where the damage exposes bare metal.

SUMMARY OF THE INVENTION

The invention provides a kit for repair of damaged porcelain. The kit contains at the least, a priming agent, an adhesive or bonding agent, a restorative material, and plastic mixing and applying means. The invention also concerns an advantageous restorative material for repair of such porcelain and a method for carrying out such repair.

The priming agent in the kit is applied to the damaged area of the porcelain after that area has been thoroughly cleaned and mechanically prepared, as will be described below. The priming agent is an aqueous solution of a weak acid, such as dilute citric acid, phosphoric acid, or other innocuous acid. Citric acid in aqueous solution, for example, is an effective as well as safe priming agent. An advantageous priming agent consists essentially of water and from 1% to 60% by weight of the solution of citric acid, preferably about 30% thereof. Where the metal substrate is exposed, it is believed that the priming agent temporarily alters the surface energy of the metal surface and results in stronger bonding between the metal and the porcelain overlay.

The bonding agent of the kit comprises a mixture of a plurality of silanes and a solvent, preferably one which is also a water-displacement agent. The surface water may be difficult to remove completely by air drying or other normal means available at some temperature-humidity conditions. Thus, it may be advantageous to use a liquid water-displacing agent, which upon contact of a drop of such agent with the surface water will force the water outward in a circular path to form a small area of the substrate surface which is quite water-free. Butanol may be employed as the solvent for the silanes, for it is also a water-displacement agent. That is, when butanol is placed in contact with a thin residual layer of water (which may often be present at the surface of the metal base and the original porcelain walls), the butanol displaces the water and gives the silanes immediate access to the metal and walls, to which the silanes will then bond. Additionally, butanol has a low vapor pressure at the temperature of working, which affords time for the surface hydrolysis of the silanes, that is, hydrolysis of the silanes by the surface water, and subsequent attachment of the silane bond to the ceramic substrate. Butanol is the preferred liquid or solvent, and it contains in solution from 0.5% to 25%, preferably about 5%, by weight of the solution of gamma-methacryloxypropyltrimethoxysilane, (A-174 silane),

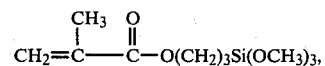

and from 0.25% to 12%, preferably about 2.5%, of gamma-glycidoxypropyltrimethoxysilane, (A-187 silane),

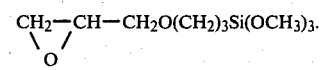

The restorative material of the kit or system comprises two types of components, namely, a powder, usually white, and a binder.

The powder is mainly a blend of a vitreous powder, suitably of a mixture of particle sizes from about 2 to about 95 microns in diameter, and a powdered plastic, preferably polyethyl methacrylate, of suitable particle size, for instance, passing through 325 mesh. In addition, a coupling agent (preferably a silane to provide chemical binding), a cure initiator, and pigment are included. The powder may be made as follows:

| Powder Mixture | | |
|---|---|---|
| | Parts by Weight | |
| Ingredient | Range | Preferred |
| 1. Powdered glass (e.g., Glidden Frit 25, a product of the Pemco division of Glidden-Durkee, a division of SCM Corp.) | 10–50 | 22 |
| 2. Poly (ethyl methacrylate) | 90–50 | 78 |
| 3. Coupling agent (e.g., Union Carbide A-174 Silane) | 1.5–3 | 1.5 |
| 4. Cure initiator (e.g., benzoyl peroxide) | 1.5–3 | 1.5 |
| 5. Pigment (e.g., titanium oxide) | 1.5–16.5 | 1.5 |

Ingredient 1 may be almost any combination of glasses and/or silicas including quartz, borosilicate glass, etc. A range of from 10–50% (by weight, of the vitreous powder to poly (ethyl methacrylate) has been used, with the optimum results being obtained with a 50% mixture. At that level, polishability is good, with color and opacity being an excellent approximation of porcelain.

Ingredients 3 and 4 may vary by as much as ±100% for each. If ultra-violet curing is to be done, ingredient 4 may be replaced by a suitable ultra-violet activated, free-radical producer, such as benzoin methyl ether.

For opaquing metal (when needed) up to 15 parts additional to the normal 1.5 parts of titanium dioxide may be used.

The preferred liquid binder for the restorative powder and metal opaquer is of the following composition:

LIQUID BINDER

| Ingredient | Parts by Weight Range | Preferred |
|---|---|---|
| Aliphatic monoacrylate (e.g., methyl or ethyl methacrylate monomer) | 40-60 | 40 |
| Tetrahydrofurfuryl methacrylate | 40-60 | 60 |
| Butyl hydroxytoluene | 0.05-1.5 | 0.1 |
| 2-hydroxyethyl-p-toluidine | 0.1-10 | 5 |

In addition, the resin may contain between 0 and 9 parts by weight of an aromatic diacrylate, such as ethoxylated bisphenol A dimethacrylate or Bis-GMA.

In the method according to this invention, the fractured or damaged area of the porcelain is preferably given a preliminary cleaning treatment, the entire area being cleaned with solvent (e.g., acetone or methylene chloride to remove residual soap, moisture, and oils). The remaining porcelain is then examined, and any material which is not solidly attached is removed. If the edges are sharp, they are beveled with a stone grinder. If metal is exposed, steel wool is used to remove any rust that may be present.

The entire area of porcelain and metal is then saturated with the priming or conditioning agent. The primer or conditioning agent does not contain hazardous hydrofluoric acid. Preferably, it is citric acid. The conditioning agent may cause some minor irritation to cracked or cut skin, or if spread to the eye. If irritation occurs, the body part is simply flushed with water. After one minute, the area is rinsed with water and a suitable solvent, such as a mixture of methylene chloride and n-butanol, is re-applied. After the solvent evaporates, the bonding agent is applied; the damaged area remains saturated with the bonding agent for 30 seconds. An air source may be used for quick removal of excess butanol, or exposure to the atmosphere will evaporate the butanol in about ten minutes.

The vitreous powder is then mixed with a small amount of the resin, both as described above, until the consistency is like honey. Using a small palette knife, the mixed material is placed in the repair site. For large repairs, multiple mixes and layering of the material is employed. When applying multiple layers, it is not necessary to re-apply the solvent, priming agent, or bonding agent between layers, for the restorative mixture will bond to itself. The finished build-up area should be slightly overfilled.

After ten minutes final cure time, the area is shaped with wet sandpaper, starting with #220, and ending with #600. A good method is to begin gross finishing with #220 grit, later switching to #320, and finishing with #600. On flat areas, use of a sanding block will assist in contouring the repair to match the surrounding porcelain. The margins are easier to match if sanding is done in an outward direction, starting at the center and being sure not to over-sand the joints. A little extra time taken on the joints goes far to improve the final appearance of the repair. Jeweler's rouge or a fine polishing compound may be used to provide a high luster on the completed repair. If desired, a glaze coating may be applied.

What is claimed is:

1. A composition for repairing porcelain fixtures including in combination a mixture of:

A. 10 to 50% by weight of a solids component containing, in powder form:

| Ingredient | Parts by Weight |
|---|---|
| 1. Powdered frit of glass or silica | 10 to 50 |
| 2. Poly (ethyl methacrylate) | 90 to 50 |
| 3. Silane coupling agent | 1.5 to 3 |
| 4. Cure initiator | 1.5 to 3 |
| 5. White pigment | 1.5 to 16.5, and |

B. 90 to 50% by weight of a liquid binder containing:

| Ingredient | Parts by Weight |
|---|---|
| 1. Aliphatic monoacrylate | 40 to 60 |
| 2. Tetrahydrofurfuryl methacrylate | 40 to 60 |
| 3. Butyl hydroxytoluene | 0.05 to 1.5 |
| 4. 2-hydroxyethyl-p-toluene | 0.1 to 10 |

2. The composition of claim 1 wherein the cure initiator is benzoyl peroxide.

3. The composition of claim 1 wherein the white pigment is titanium dioxide.

4. The composition of claim 1 wherein the aliphatic monocrylate is methyl methacrylate monomer.

5. The composition of claim 1 wherein the aliphatic monoacrylate is ethyl methacrylate monomer.

6. The composition of claim 1 wherein there is, in addition, up to nine parts by weight of an aromatic diacrylate.

7. The composition of claim 6 wherein the aromatic diacrylate is ethoxylated bisphenol A dimethacrylate.

8. The composition of claim 6 wherein the aromatic diacrylate is Bis-GMA.

9. The composition of claim 1 wherein the powdered glass is borosilicate glass.

10. A composition for repairing porcelain fixtures, consisting essentially of the mixture of:

A. 10% to 50% of a powdered mixture of:

| Ingredient | Approx. Parts by Weight |
|---|---|
| 1. Frit (powdered glass or silica) | 22 |
| 2. Poly (ethyl methacrylate) | 78 |
| 3. Silane coupling agent | 1.5 |
| 4. Benzoyl peroxide | 1.5 |
| 5. Titanium dioxide | 15, and |

B. 90% to 50% of a liquid binder of:

| | Ingredient | Approx. Parts by Weight |
|---|---|---|
| 1. | Methyl or ethyl methacrylate monomer | 40. |
| 2. | Tetrohydrofurfuryl methacrylate | 60. |
| 3. | Butyl hydroxytoluene | 0.1 |
| 4. | 2-hydroxyethyl-p-toluene | 5. |
| 5. | Ethoxylated bisphenol A dimethacrylate | 0 to 9 |

* * * * *